(12) United States Patent
Ku et al.

(10) Patent No.: US 7,855,514 B2
(45) Date of Patent: Dec. 21, 2010

(54) LED INDICATOR DEVICE FOR AC POWER PLUG OR SOCKET

(75) Inventors: Ying-Ming Ku, Taoyuan (TW); Chun-Mei Wu, Taoyuan (TW); Yvjie Zhang, Taoyuan (TW); Qiang Lu, Taoyuan (TW)

(73) Assignee: YFC-Boneagle Electric Co., Ltd., Taoyuan (TW)

( * ) Notice: Subject to any disclaimer, the term of this patent is extended or adjusted under 35 U.S.C. 154(b) by 449 days.

(21) Appl. No.: 12/044,018

(22) Filed: Mar. 7, 2008

(65) Prior Publication Data

US 2008/0290817 A1    Nov. 27, 2008

Related U.S. Application Data

(63) Continuation-in-part of application No. 11/752,974, filed on May 24, 2007, now abandoned.

(51) Int. Cl.
H05B 37/04 (2006.01)

(52) U.S. Cl. ................... 315/132; 315/120; 315/294

(58) Field of Classification Search ............... 315/119, 315/120, 132–134, 246, 291, 294; 361/42, 361/49, 50, 90, 91.1; 439/490
See application file for complete search history.

(56) References Cited

U.S. PATENT DOCUMENTS 5,300,864 A * 4/1994 Allen, Jr. .................. 315/314
5,861,720 A * 1/1999 Johnson .................... 315/291
7,015,654 B1 * 3/2006 Kuhlmann et al. ........ 315/291
7,136,266 B2 * 11/2006 Gershen et al. ............ 361/42
7,221,106 B1 * 5/2007 Nemir et al. ............... 315/291
2008/0094764 A1 * 4/2008 Zhang et al. .............. 361/42
2008/0290817 A1 * 11/2008 Ku et al. .................... 315/294

* cited by examiner

Primary Examiner—Douglas W Owens
Assistant Examiner—Tung X Le
(74) Attorney, Agent, or Firm—Alan Kamrach; Kamrath & Associates PA

(57) ABSTRACT

An LED indicator device is mounted in an AC power plug or socket and electrically connected in parallel with an AC power source. The LED indicator device includes a driving/current-limiting circuit to which an LED lighting circuit is coupled. The driving/current-limiting circuit includes a driving/current-limiting capacitor and a discharge resistor connected in parallel with the driving/current-limiting capacitor. The LED lighting circuit includes an LED, a protective instantaneous current-limiting resistor coupled to the LED, a rectifying diode connected in parallel with the LED, and a protective instantaneous voltage-limiting capacitor connected in parallel with the LED. The LED is lit to show the position and on/off state of the AC power plug or socket. Three LEDs emitting different colors and associated driving/current-limiting circuits and associated LED lighting circuits can be utilized to indicate incorrect power connection or short circuit of the AC power plug or socket.

3 Claims, 6 Drawing Sheets

LED INDICATOR DEVICE FOR AC POWER PLUG OR SOCKET

CROSS REFERENCE TO RELATED APPLICATION

This is a continuation-in-part application of U.S. patent application Ser. No. 11/752,974 filed May 24, 2007 now abandoned.

BACKGROUND OF THE INVENTION

The present invention relates to an LED indicator device for an AC power plug or socket and, more particularly, to an LED indicator device for indicating on/off and/or incorrect power connection or short circuit of an AC power plug or socket such as a fixed AC power socket, a socket of an AC adaptor, or a plug or socket of an AC extension cord.

AC power sockets include fixed AC power sockets, sockets of AC extension cords, and sockets of AC adapters. Fixed AC power sockets are electrically connected to an external AC power source. An AC extension cord includes a plug for coupling with an AC power socket in a building. The AC extension cord further includes a socket casing having one or more sockets for coupling with a plug of an electric appliance to supply external AC power through the plug and the socket of the AC extension cord to the electric appliance.

However, users are often not aware of the existence and on/off state of the fixed AC power socket or the AC extension cord. To solve this problem, a small neon lamp is provided on the socket casing. Particularly, the neon lamp is lit to show the extension cord and to indicate that the power is on. However, the life of the neon lamp is only about 30,000 hours. Furthermore, when it is desired to detect electrical connection of the hot wire, neutral wire, and grounding wire of AC power lines, only simple tests for identifying these wires can be done. It is impossible to identify correct electrical connection or short circuit of an AC power plug or socket.

A need exists for a device for indicating electrical connection between wires and/or on/off state of an AC power plug or socket

SUMMARY OF THE INVENTION

An objective of the present invention is to provide an LED (light-emitting diode) indicator device for an AC power plug or socket that is suitable for an AC power source of 110V or 220V. The LED indicator device includes an LED lighting circuit having an LED and can be driven by a capacitor that provides a reactive power current-limiting impedance to light the light-emitting diode, avoiding generation of heat of the circuit during conversion of voltage energy. Thus, the circuit can withstand impact of electricity during insertion and removal of the plug. LED has a life up to 100,000 hours and consumes little electricity. Furthermore, LED is small in size and has various colors suitable for various circumstances.

According to an aspect of the present invention, an LED indicator device is adapted to be mounted in an insulating body of an AC power plug or an AC power socket. The insulating body includes a plurality of conductive plates adapted to be in electrical connection with an AC power source. The LED indicator device is electrically connected in parallel with the AC power source. The LED indicator device includes a first driving/current-limiting circuit and a first LED lighting circuit coupled to the first driving/current-limiting circuit. The first driving/current-limiting circuit includes a first driving/current-limiting capacitor and a first discharge resistor connected in parallel with the first driving/current-limiting capacitor. The first LED lighting circuit includes a first light-emitting diode, a first protective instantaneous current-limiting resistor coupled to the first light-emitting diode, a first rectifying diode connected in parallel with the first light-emitting diode, and a first protective instantaneous voltage-limiting capacitor connected in parallel with the first light-emitting diode. The LED is lit to show the position of the AC power plug or socket and on/off state of the AC power plug or socket.

The LED indicator device can further include a second rectifying diode coupled between the first light-emitting diode and the first rectifying diode. The first and second rectifying diodes forming a half-wave rectifying circuit to make the first light-emitting diode flicker.

According to another aspect of the present invention, the first LED indicator device is connected in parallel between a hot wire and a neutral wire of the AC power source. A second driving/current-limiting circuit and a second LED lighting circuit are electrically connected in parallel between the hot wire and a grounding wire of the AC power source. The second driving/current-limiting circuit includes a second driving/current-limiting capacitor and a second discharge resistor connected in parallel with the second driving/current-limiting capacitor. The second LED lighting circuit is coupled to the second driving/current-limiting circuit. The second LED lighting circuit includes a second light-emitting diode emitting a color different from that emitted by the first light-emitting diode, a second protective instantaneous current-limiting resistor coupled to the second light-emitting diode, a second rectifying diode connected in parallel with the second light-emitting diode, and a second protective instantaneous voltage-limiting capacitor connected in parallel with the second light-emitting diode. Furthermore, a third driving/current-limiting circuit and a third LED lighting circuit are electrically connected in parallel between the neutral wire and the grounding wire of the AC power source. The third driving/current-limiting circuit including a third driving/current-limiting capacitor and a third discharge resistor connected in parallel with the third driving/current-limiting capacitor. The third LED lighting circuit is coupled to the third driving/current-limiting circuit. The third LED lighting circuit includes a third light-emitting diode emitting a color different from those emitted by the first and second light-emitting diodes, a third protective instantaneous current-limiting resistor coupled to the third light-emitting diode, a third rectifying diode connected in parallel with the third light-emitting diode, and a third protective instantaneous voltage-limiting capacitor connected in parallel with the third light-emitting diode. The first, second, and third light-emitting diodes are lit or not lit in response to various wire connections between the wires. Thus, incorrect power connection or short circuit of the AC power plug or socket can be indicated by the first, second, and third light-emitting diodes.

Other objectives, advantages, and novel features of the invention will become more apparent from the following detailed description when taken in conjunction with the accompanying drawings.

DETAILED DESCRIPTION OF THE PREFERRED EMBODIMENTS

An LED indicator device 41 according to the preferred teachings of the present invention can be utilized with an AC power plug or socket. In a preferred form shown in FIGS. 1 and 2, the LED indicator device 41 is utilized on a plug 20 and a socket 30 of an AC extension cord. However, it can be appreciated that the LED indicator device 41 according to the preferred teachings of the present invention can also be used with a fixed AC power socket or a socket of an AC adaptor.

Figure 1:
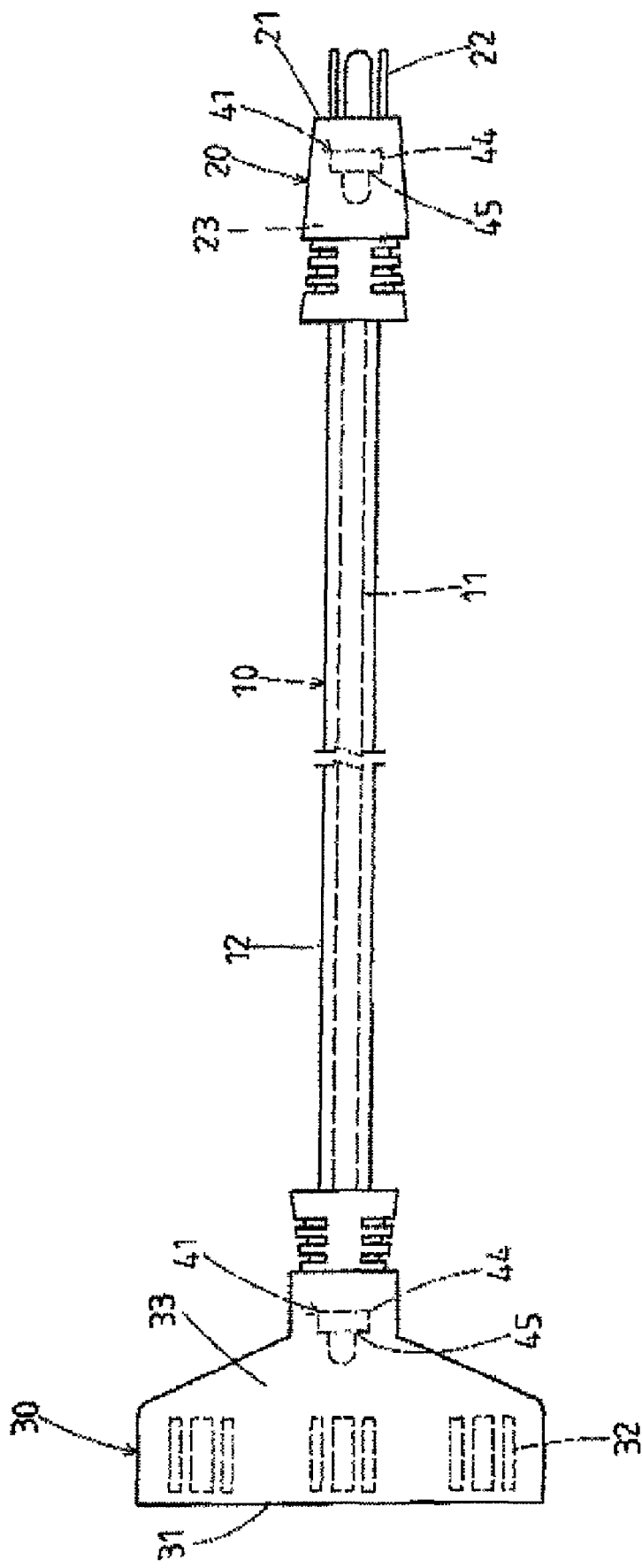
FIG. 1 shows an elevational perspective view of an AC extension cord utilizing an LED indicator device according to the preferred teachings of the present invention
Figure 2:
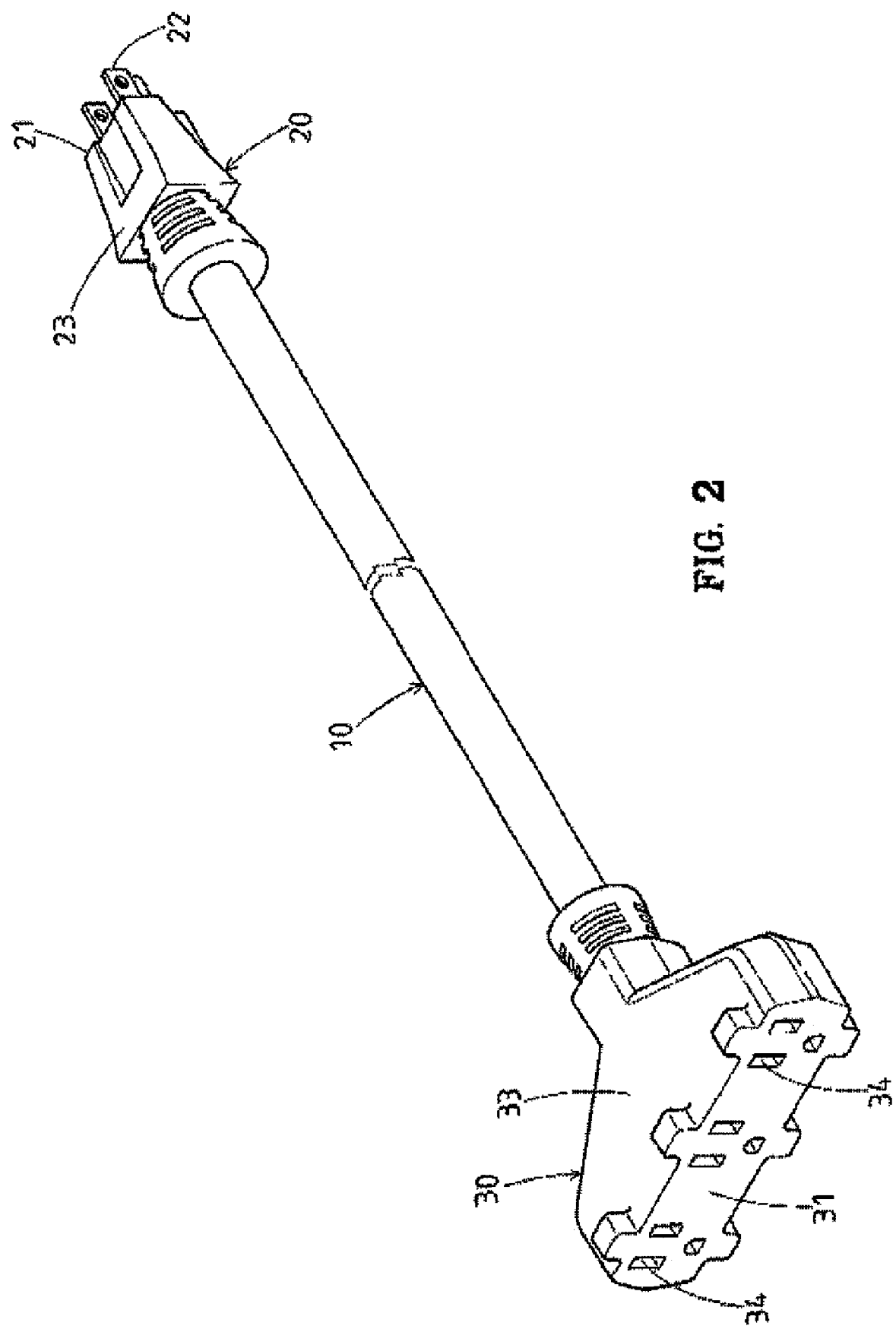
FIG. 2 shows a perspective view of the extension cord of FIG. 1.

According to the preferred form shown in FIGS. 1 and 2, the AC extension cord includes a cable 10, a plug 20 formed on an end of the cable 10, and a socket 30 formed on the other end of the cable 10. The cable 10 includes a plurality of conductive wires 11 and an outer coating 12 that sheathes the conductive wires 11. The plug 20 includes an insulating body 21 and a plurality of prongs 22 supported by the insulating body 21 and electrically connected to the conductive wires 11. The socket 30 includes an insulating body 31 having a plurality of conductive plates 32 electrically connected to the conductive wires 11 of the cable 10 and a plurality of slots 34 mounted in the insulating body 31 for receiving prongs (not shown) of a plug (not shown) of an electric appliance (not shown) or the like.

According to the preferred form shown, the AC extension cord further includes an LED indicator device 41 mounted in each of the plug 20 and the socket 30. Each LED indicator device 41 is electrically connected in parallel with a hot wire 111 and a neutral wire 112 of the conductive wires 11. Specifically, each LED indicator device 41 includes a driving/current-limiting circuit 44 and an LED lighting circuit 45. The driving/current-limiting circuit 44 includes a driving/current-limiting capacitor C1 and a discharge resistor R1 connected in parallel with the driving/current-limiting capacitor C1. The discharge resistor R1 provides a discharging path for the driving/current-limiting capacitor C1. The LED lighting circuit 45 includes a light-emitting diode LED1, a protective instantaneous current-limiting resistor R2 coupled to the light-emitting diode LED1, a rectifying diode D1 connected in parallel with the light-emitting diode LED1, and a protective instantaneous voltage-limiting capacitor C2 connected in parallel with the light-emitting diode LED1. The protective instantaneous voltage-limiting capacitor C2 and the protective instantaneous current-limiting resistor R2 respectively provide instantaneous voltage-limiting protection and instantaneous current-limiting protection. When an AC power is inputted, the driving/current-limiting capacitor C1 provides a reactive power current-limiting impedance to light the light-emitting diode LED1 for showing the position of the plug 20 and the socket 30 and to indicate that the AC extension cord is on. It can be appreciated that the insulating bodies 21, 31 are light transmittable so that light beams emitted from the light-emitting diode LED1 transmit outward. It can be further appreciated that the LED indicator device 41 in the plug 20 or in the socket 30 can be omitted whenever desired.

Figure 4:
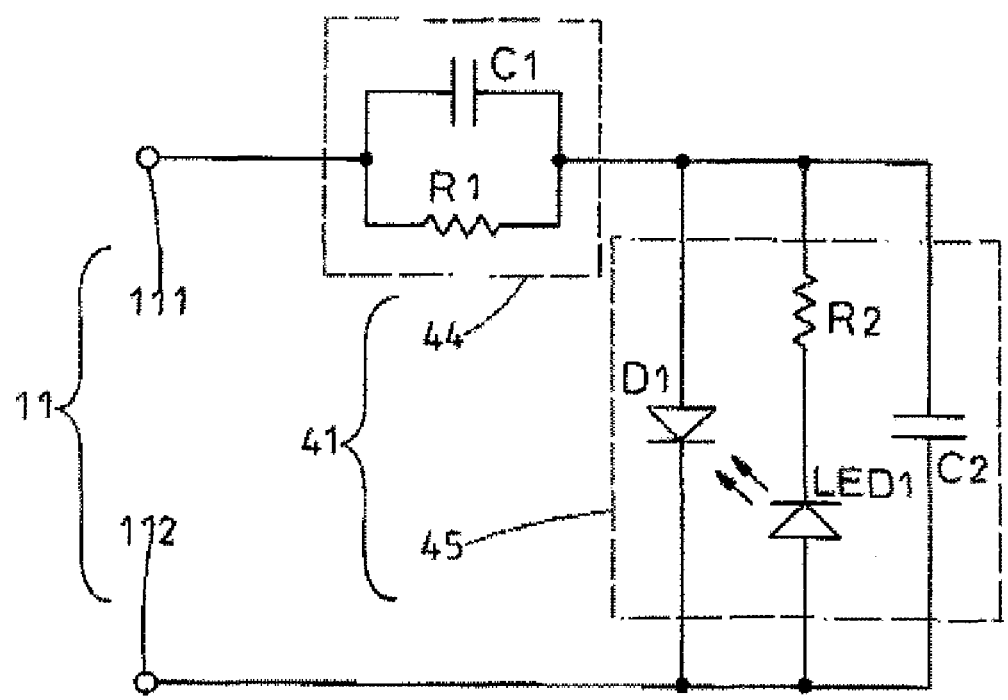
FIG. 4 shows another example of the circuit diagram of the LED indicator device according to the preferred teachings of the present invention.

In another example shown in FIG. 4, the directions of the rectifying diode D1 and the light-emitting diode LED1 are changed.

Figure 3:
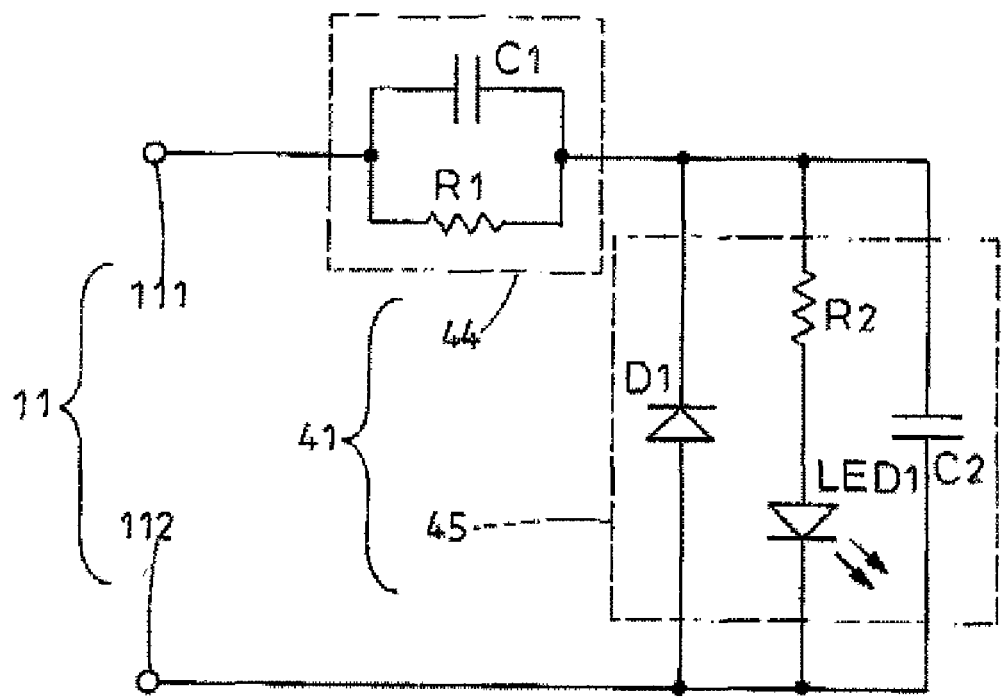
FIG. 3 shows an example of a circuit diagram of the LED indicator device according to the preferred teachings of the present invention.
Figure 5:
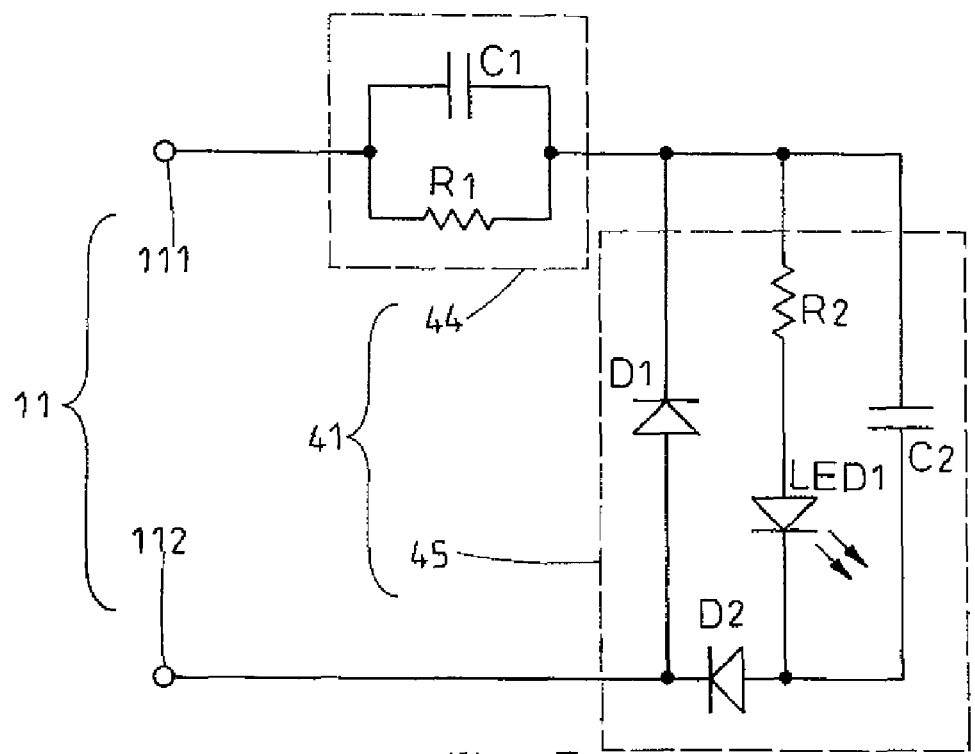
FIG. 5 shows a further example of the circuit diagram of the LED indicator device according to the preferred teachings of the present invention.

With reference to FIG. 5, another rectifying diode D2 can be added into the circuit shown in FIG. 3 and coupled between the light-emitting diode LED1 and the rectifying diode D1. Thus, the two rectifying diodes D1 and D2 form a half-wave rectifying circuit to make the light-emitting diode LED1 flicker.

Figure 6:
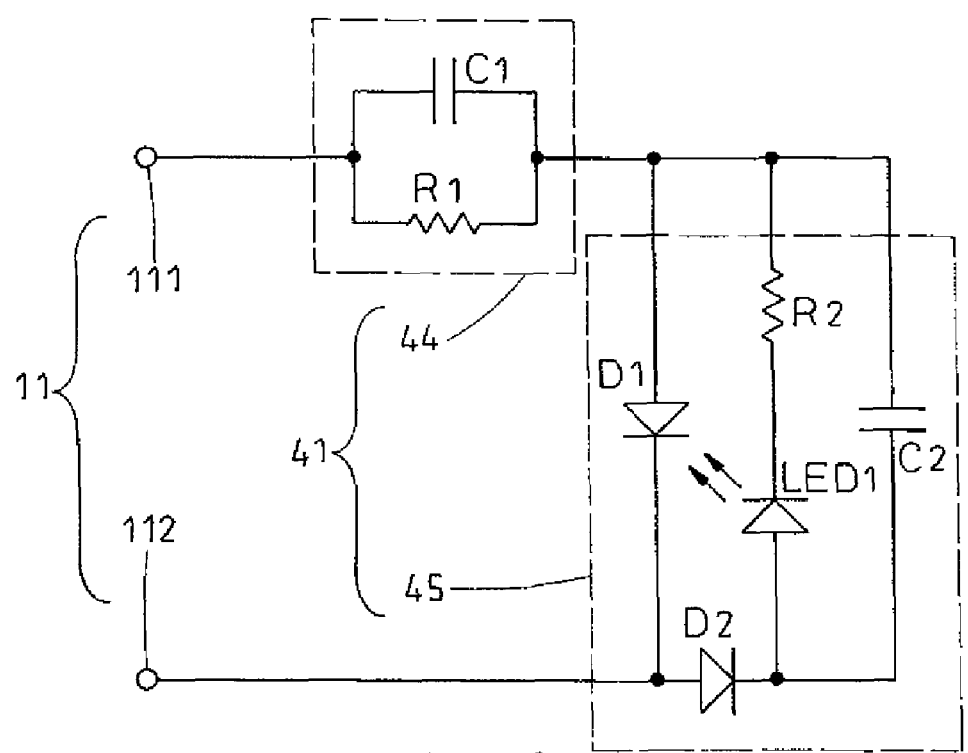
FIG. 6 shows still another example of the circuit diagram of the LED indicator device according to the preferred teachings of the present invention.

Similarly, with reference to FIG. 6, another rectifying diode D2 can be added into the circuit shown in FIG. 4 and coupled between the light-emitting diode LED1 and the rectifying diode D1. Thus, the two rectifying diodes D1 and D2 form a semi-wave rectifying circuit to make the light-emitting diode LED1 flicker.

Figure 7:
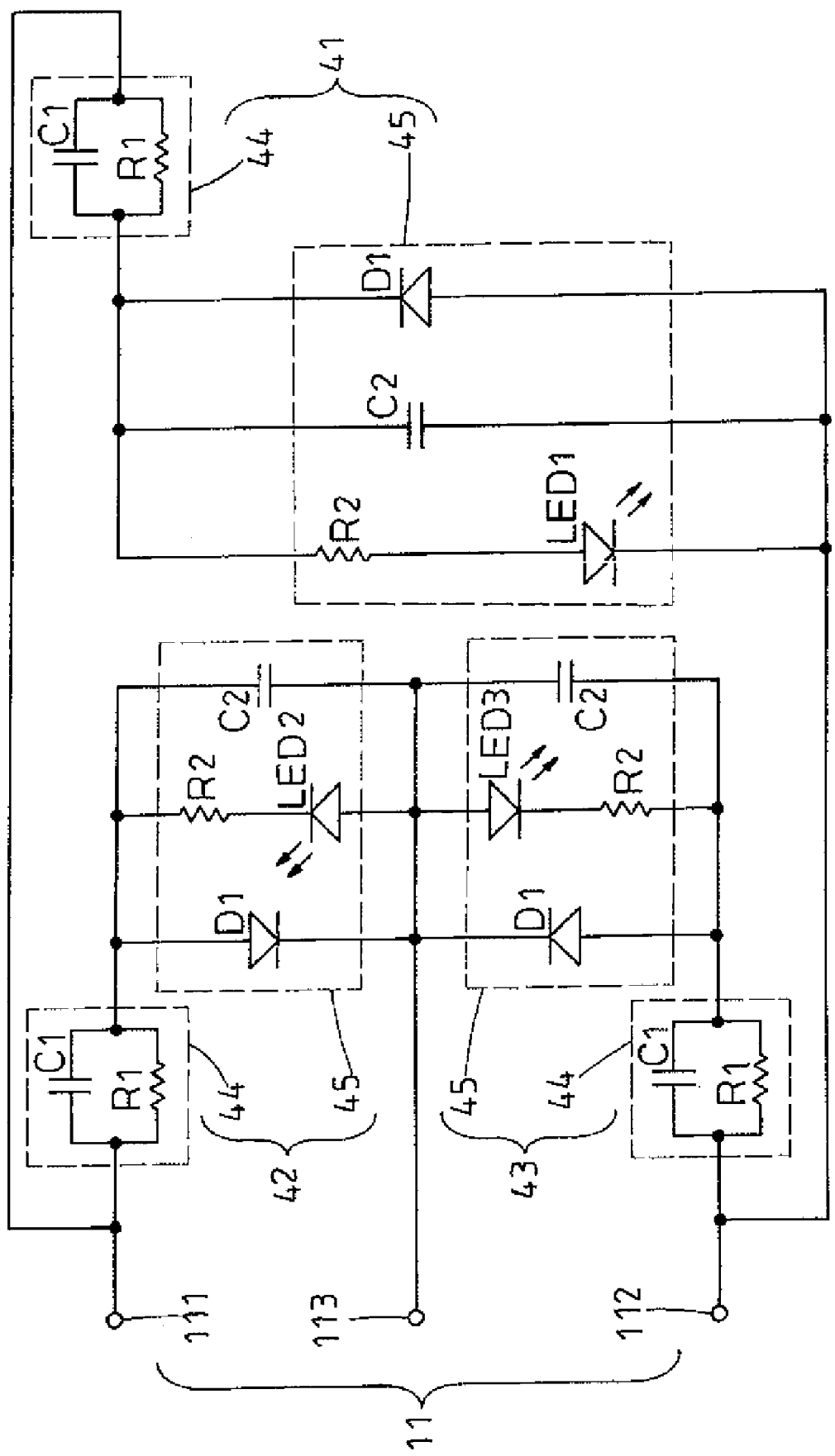
FIG. 7 shows a circuit diagram utilizing three LED indicator devices according to the preferred teachings of the present invention.
Figure 8:
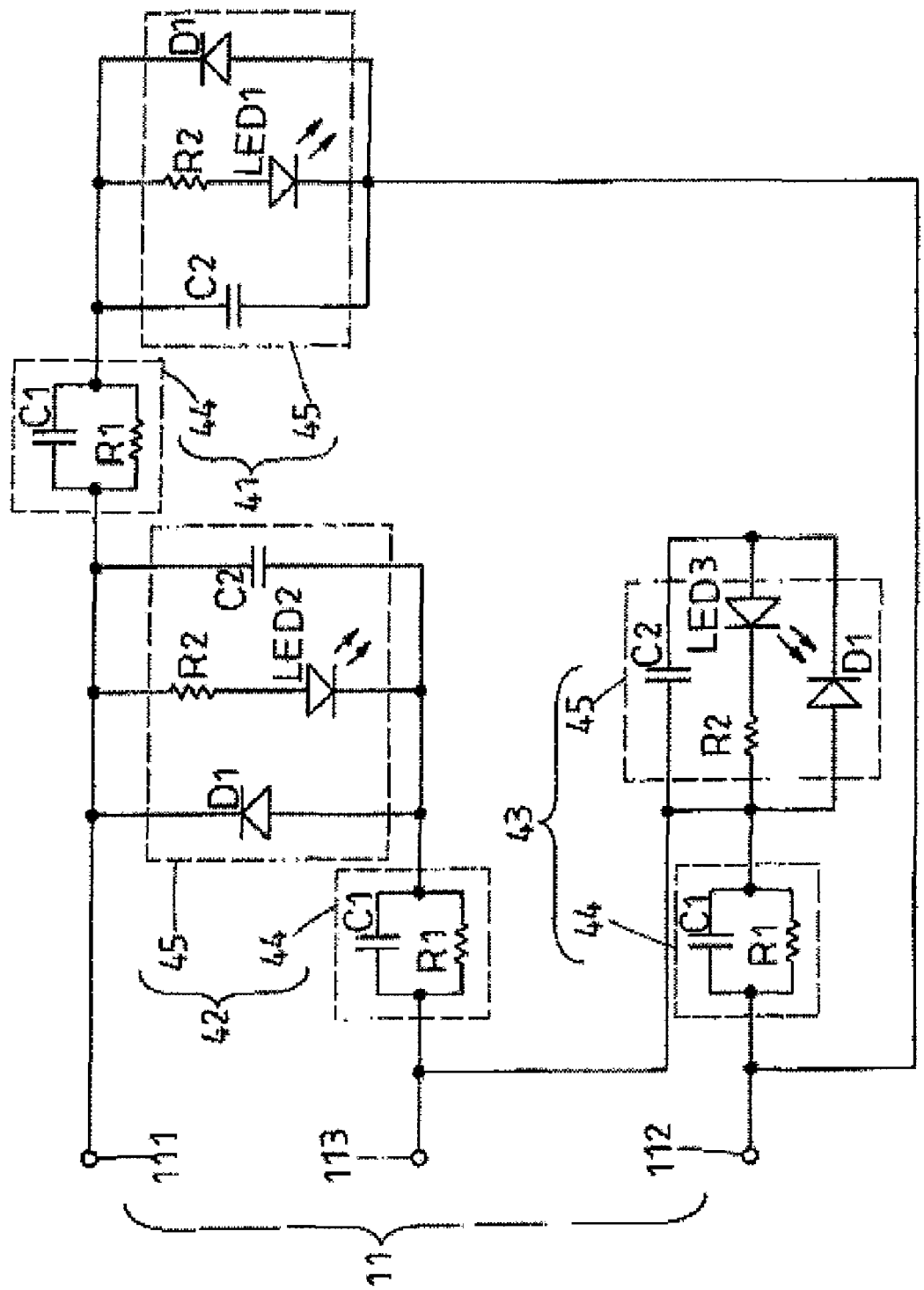
FIG. 8 shows another circuit diagram utilizing three LED indicator devices according to the preferred teachings of the present invention.

FIGS. 7 and 8 show two equivalent examples of another embodiment utilizing three LED indicator devices 41, 42 and 43 according to the preferred teachings of the present invention for detecting electrical connection of a hot wire 111, a neutral wire 112, and a grounding wire 113 of the conductive wires 11 of an AC power source in a building or the like. Specifically, the LED indicator device 41 is electrically connected in parallel between the hot wire 111 and the neutral wire 112, the LED indicator device 42 is electrically connected in parallel between the hot wire 111 and the grounding wire 113, and the LED indicator device 43 is electrically connected in parallel between the neutral wire 112 and the grounding wire 113. Each LED indicator device 41, 42, 43 includes a driving/current-limiting circuit 44 and an LED lighting circuit 45 mentioned above. The LED lighting circuit 45 of each LED indicator device 41, 42, 43 includes a light-emitting diode LED1, LED2, LED3, a protective instantaneous current-limiting resistor R2 coupled to the light-emitting diode LED1, a rectifying diode D1 connected in parallel with the light-emitting diode LED1, and a protective instantaneous voltage-limiting capacitor C2 connected in parallel with the light-emitting diode LED1. The only differences between the LED indicator devices 41, 42, and 43 are that the colors of the light-emitting diodes LED1, LED2, LED3 of the LED indicator devices 41, 42, 43 are different from one another to indicate corresponding electrical connection between the wires 111, 112, and 113.

There are six wire connection statuses between the hot wire 111, the neutral wire 112, and the grounding wire 113 as follows:

1. Correct

Voltage is normally supplied from the hot wire 111 to the neutral wire 112 and from the hot wire 111 to the grounding wire 113. Thus, the light-emitting diodes LED1 and LED2 are lit. However, the voltage between the neutral wire 112 and the grounding wire 113 is almost zero such that the light-emitting diode LED3 is not lit.

2. Open Hot

The voltage between the neutral wire 112 and the grounding wire 113 is almost zero. The voltage between the hot wire 111 and the neutral wire 112 is 110V (or 220V), and the voltage between the hot wire 111 and the grounding wire 113 is 110V (or 220V). No voltage difference is provided when open neutral exists. No current exists in each LED indicator device 41, 42, 43. As a result, all of the light-emitting diodes LED1, LED2, and LED3 are not fit.

3. Open Neutral

When open neutral exists, no voltage difference is provided between the hot wire 111 and neutral wire 112, and the voltage between the neutral wire 112 and the grounding wire 113 is almost zero. Thus, the light-emitting diodes LED1 and LED3 are not lit. However, the light-emitting diode LED2 is lit, for voltage is normally supplied from the hot wire 111 to the grounding wire 113.

4. Open GND

When open ground exists, voltage is normally supplied from the hot wire 111 to the neutral wire 112 such that the light emitting diode LED1 is lit. However, the circuits for driving the light-emitting diodes LED2 and LED3 are connected in series such that the current-limiting capacitors C1 of the LED indicator devices 42 and 43 are connected in series. Since the impedance of the current-limiting capacitors C1 of the LED indicator devices 42 and 43 is set to be smaller than the driving current for the light-emitting diodes LED2 and LED3, the light-emitting diodes LED2 and LED3 are not lit.

5. Hot/GND REV

When the hot wire 111 and the grounding wire 113 are reversely connected, voltage is normally supplied from the hot wire 111 to the grounding wire 113 and from the hot wire 111 to the neutral wire 112. The light-emitting diodes LED2 and LED3 are, thus, lit. However, the wires of the driving circuit for the light-emitting diode LED1 becomes the neutral wire 112 and the grounding wire 113. As a result, the light-emitting diode LED1 is not lit.

6. Hot/Neutral REV

When the hot wire 111 and the neutral wire 112 are reversely connected, the wires of the driving circuit for the light-emitting diode LED2 becomes the neutral wire 112 and the grounding wire 113. As a result, the light-emitting diode LED2 is not lit However, voltage is normally supplied from the hot wire 111 to the grounding wire 113 and from the hot wire 111 to the neutral wire 112. The light-emitting diodes LED1 and LED3 are, thus, lit.

The LED indicator devices 41, 42, 43 according to the preferred teachings of the present invention are suitable for an AC power source of 110V or 220V. Each LED indicator device 41, 42, 43 includes an LED fighting circuit 45 having a light-emitting diode LED1, LED2, LED3 and can be driven by a capacitor C2 that provides a reactive power current-limiting impedance to light the light-emitting diode LED1, LED2, LED3, avoiding generation of heat of the circuit during conversion of voltage energy. Thus, the circuit can withstand impact of electricity during insertion and removal of the plug. The light-emitting diodes LED1, LED2, LED3 have a long life up to 100,000, consume little electricity, and are small in size. The light-emitting diodes LED1, LED2, LED3 emit light beams of various colors and are suitable for various circumstances to show the position of the AC power plug or socket and to indicate on/off state of the AC power plug or socket. Furthermore, the light-emitting diodes LED1, LED2, LED3 can indicate incorrect power connection or short circuit of an AC power plug or socket.

Although specific embodiments have been illustrated and described, numerous modifications and variations are still possible without departing from the teachings of the invention. The scope of the invention is limited by the accompanying claims.

What is claimed is:

1. An LED indicator device adapted to be mounted in an insulating body of an AC power plug or an AC power socket, the insulating body including a plurality of conductive plates adapted to be in electrical connection with an AC power source, the AC power source including a hot wire, a neutral wire, and a grounding wire, the LED indicator device being electrically connected in parallel with the AC power source, the LED indicator device being connected in parallel between the hot wire and the neutral wire, comprising:

a first driving/current-limiting circuit including a first driving/current-limiting capacitor and a first discharge resistor connected in parallel with the first driving/current-limiting capacitor;

a first LED lighting circuit coupled to the first driving/current-limiting circuit, the first LED lighting circuit including a first light-emitting diode, a first protective instantaneous current-limiting resistor coupled to the first light-emitting diode, a first rectifying diode connected in parallel with the first light-emitting diode, and a first protective instantaneous voltage-limiting capacitor connected in parallel with the first light-emitting diode;

a second driving/current-limiting circuit and a second LED lighting circuit electrically connected in parallel between the hot wire and the grounding wire, with the second driving/current-limiting circuit including a second driving/current-limiting capacitor and a second discharge resistor connected in parallel with the second driving/current-limiting capacitor, the second LED lighting circuit being coupled to the second driving/current-limiting circuit, the second LED lighting circuit including a second light-emitting diode emitting a color different from that emitted by the first light-emitting diode, a second protective instantaneous current-limiting resistor coupled to the second light-emitting diode, a second rectifying diode connected in parallel with the second light-emitting diode, and a second protective instantaneous voltage-limiting capacitor connected in parallel with the second light-emitting diode; and a third driving/current-limiting circuit and a third LED lighting circuit electrically connected in parallel between the neutral wire and the grounding wire, the third driving/current-limiting circuit including a third driving/current-limiting capacitor and a third discharge resistor connected in parallel with the third driving/current-limiting capacitor, the third LED lighting circuit being coupled to the third driving/current-limiting circuit, the third LED lighting circuit including a third light-emitting diode emitting a color different from those emitted by the first and second light-emitting diodes, a third protective instantaneous current-limiting resistor coupled to the third light-emitting diode, a third rectifying diode connected in parallel with the third light-emitting diode, and a third protective instantaneous voltage-limiting capacitor connected in parallel with the third light-emitting diode.

2. The LED indicator device as claimed in claim 1, further comprising: a second rectifying diode coupled between the first light-emitting diode and the first rectifying diode.

3. The LED indicator device as claimed in claim 2, the first and second rectifying diodes forming a half-wave rectifying circuit.

* * * * *